United States Patent [19]
Brunner et al.

[11] Patent Number: 5,799,372
[45] Date of Patent: Sep. 1, 1998

[54] SYSTEM FOR SUPPORTING A MONITOR

[75] Inventors: Robert D. Brunner, Los Gatos; Sung Kim, Palo Alto, both of Calif.

[73] Assignee: Toshiba America Information Systems, Inc., Irvine, Calif.

[21] Appl. No.: 700,309

[22] Filed: Aug. 21, 1996

[51] Int. Cl.⁶ ............................................. E05C 17/64
[52] U.S. Cl. .................. 16/342; 16/307; 248/133; 248/917
[58] Field of Search .................. 16/342, 337, 304, 16/306, 307, 308, 285, 386, 387; 248/133, 144, 917, 918, 919, 920, 921, 922, 923

[56] References Cited

U.S. PATENT DOCUMENTS

| | | | |
|---|---|---|---|
| D. 266,762 | 11/1982 | Gibson . | |
| D. 291,575 | 8/1987 | Wiseman . | |
| D. 299,236 | 1/1989 | High . | |
| D. 303,794 | 10/1989 | Brunner . | |
| D. 304,179 | 10/1989 | Beaton et al. . | |
| D. 306,026 | 2/1990 | Boykiw . | |
| D. 310,067 | 8/1990 | Koprowski et al. . | |
| D. 311,000 | 10/1990 | Bellini . | |
| D. 311,392 | 10/1990 | Hillary et al. . | |
| D. 311,738 | 10/1990 | Landry et al. . | |
| D. 313,431 | 1/1991 | Jaskiel, Jr. et al. . | |
| D. 317,760 | 6/1991 | Esslinger . | |
| D. 318,657 | 7/1991 | Wiseman . | |
| D. 339,796 | 9/1993 | Goodner et al. . | |
| D. 348,056 | 6/1994 | Savio . | |
| D. 354,483 | 1/1995 | Yamazaki . | |
| D. 355,175 | 2/1995 | Masunari et al. . | |
| D. 360,410 | 7/1995 | Lee . | |
| D. 368,706 | 4/1996 | Mieki . | |
| 1,384,260 | 7/1921 | Kanter | 16/307 |
| 3,045,615 | 7/1962 | Atchison | 16/307 |
| 4,193,164 | 3/1980 | Okayama | 16/307 |
| 4,524,940 | 6/1985 | Yurchenco et al. | 248/371 |
| 4,624,433 | 11/1986 | Henneberg | 248/346.01 |
| 4,624,434 | 11/1986 | Lake, Jr. et al. | 248/454 |
| 4,669,694 | 6/1987 | Malick | 248/456 |
| 4,691,886 | 9/1987 | Wendling et al. | 248/123.11 |
| 4,919,387 | 4/1990 | Sampson | 248/371 |
| 4,944,481 | 7/1990 | Yurchenco et al. | 248/923 |
| 4,984,706 | 1/1991 | Cadwell et al. . | |
| 5,028,913 | 7/1991 | Kitamura . | |
| 5,041,818 | 8/1991 | Liu | 16/342 |
| 5,043,846 | 8/1991 | Kinoshita . | |
| 5,075,929 | 12/1991 | Chung | 16/337 |
| 5,079,799 | 1/1992 | Rude et al. | 16/342 |
| 5,100,098 | 3/1992 | Hawkins | 248/917 |
| 5,211,368 | 5/1993 | Kitamura | 248/292.11 |
| 5,231,734 | 8/1993 | Rude | 16/342 |
| 5,354,028 | 10/1994 | Kitamura | 248/292.11 |
| 5,396,399 | 3/1995 | Blair et al. . | |
| 5,428,730 | 6/1995 | Baker et al. | 395/154 |
| 5,436,792 | 7/1995 | Leman et al. | 16/342 |
| 5,464,083 | 11/1995 | Arnold et al. | 16/337 |
| 5,491,874 | 2/1996 | Lowry et al. . | |
| 5,503,361 | 4/1996 | Kan-O et al. | 248/918 |
| 5,503,491 | 4/1996 | Lu . | |
| 5,520,361 | 5/1996 | Lee | 248/923 |

*Primary Examiner*—Chuck Mah
*Attorney, Agent, or Firm*—Banner & Witcoff, Ltd.

[57] ABSTRACT

The present invention provides a support system for varying the display angle of a monitor. The support system includes a hinge assembly for rotatably coupling the monitor to a base member, the base member having a lower surface for contacting a support surface. A spring assembly is coupled to the hinge assembly and an adapter connects the hinge assembly and spring assembly to the base member. The hinge assembly and the spring assembly provide angular positional control of the monitor with respect to the base member.

14 Claims, 13 Drawing Sheets

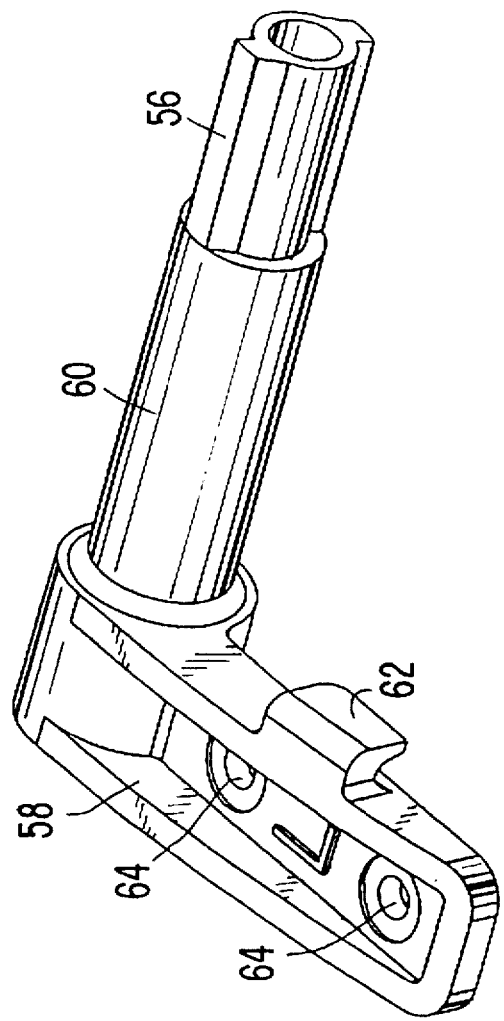

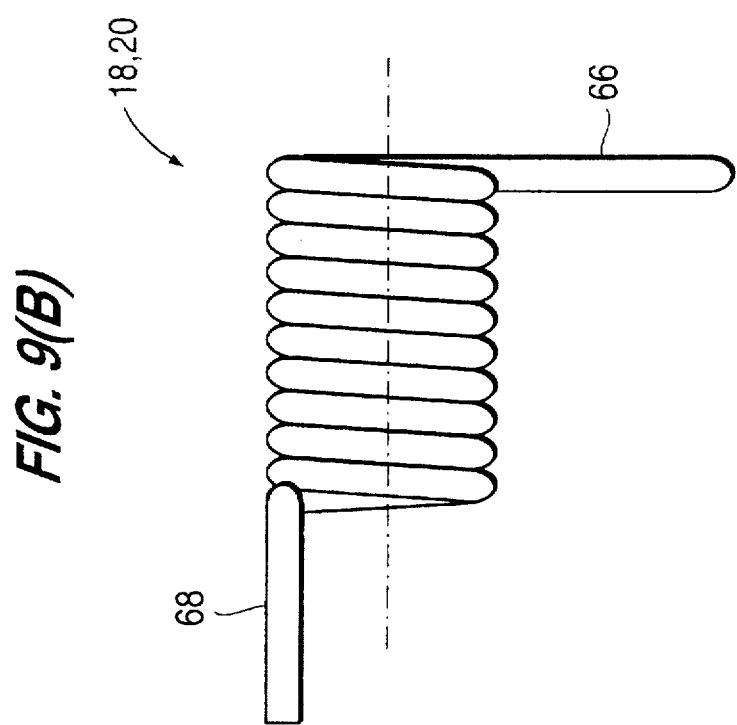
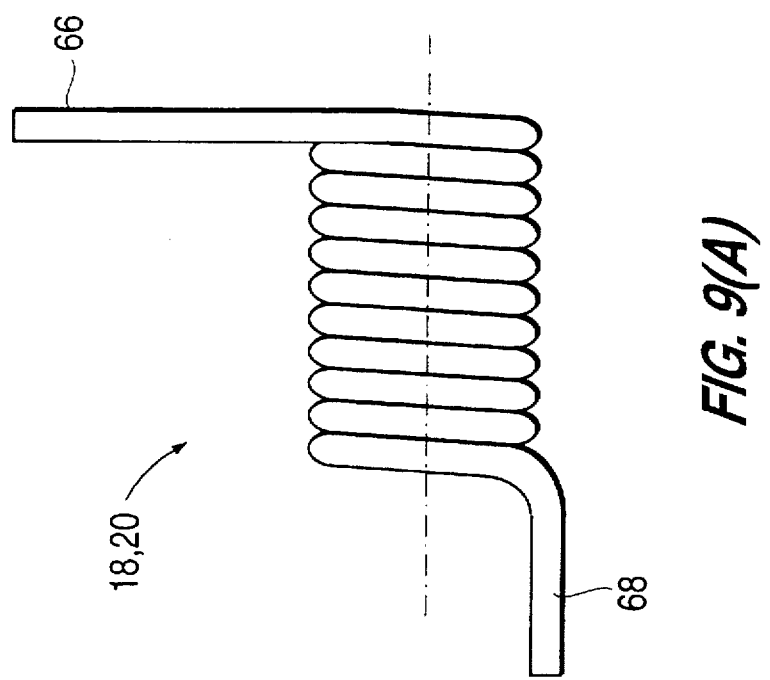

SYSTEM FOR SUPPORTING A MONITOR

TECHNICAL FIELD

The present invention relates to a system for supporting an electronic monitor, and more particularly, to a support system for adjusting the display angle of a monitor for a computer or similar electronic apparatus.

BACKGROUND OF THE INVENTION

As desk top computers, multimedia centers, video games and similar such electronic apparatus have increased in popularity within the last several years, so have the problems associated with obtaining the correct display angle for the monitor or CRT display terminal attached thereto. An incorrect display angle causes the natural light around the screen surface to produce reflections or glare, resulting in a screen that is virtually impossible to see. Other problems occurring as a result of incorrect display angle include shoulder and neck strain caused by a monitor that is tilted either too far forward, too far rearward, or positioned too high because of the height of the monitor support system. Thus, many systems and monitor stands have been developed to enable the user to position the monitor at the desired angle and to retain the monitor in the preferred position. Unfortunately, most prior art systems have been complex and cumbersome attachments for the monitor, required significant assembly and/or installation, failed to adequately support the monitor in the desired position (requiring repeated readjustment), required a significant two hand force to be applied to adjust the tilt angle, and/or been expensive to manufacture.

SUMMARY OF THE INVENTION

The present invention overcomes these disadvantages by providing a monitor support system having a rear foot assembly that attaches to the rear of the monitor for adjusting the display angle thereof. The rear foot assembly includes a hinge assembly releasably secured to the rear of the monitor, a spring assembly coupled to the hinge assembly, and a base member having a front end and a rear end for contacting a support surface beneath the monitor. The display angle of the monitor is adjustable from a rearward position such that said base member virtually contacts the rear portion of the monitor to a forward position such that the base member is spaced from the rear portion of the monitor by a maximum distance. The base member contacts the support surface at a support contact point defined between the front end and the rear end thereof such that the contact point moves toward the front end of the base member as the monitor is tilted toward the rearward position.

In a preferred embodiment of the present invention, the support system includes a hinge assembly for rotatably coupling a first member to a base member and the base member has a lower surface for contacting a support surface. A spring assembly is coupled to the hinge assembly and an adapter connects the hinge assembly and spring assembly to the base member. The hinge assembly and the spring assembly provide angular positional control of the first member with respect to the base member. More preferably, the hinge assembly includes a friction element having an internal surface defining a generally cylindrical cavity and a generally cylindrical pintle having an external surface and first and second portions. The first portion of the pintle is positioned within the cavity such that the external surface of the pintle is in facing frictional engagement with the internal surface of the friction element. The preferred spring assembly includes at least one torsional spring closely wound about the second portion of the pintle, the torsional spring having first and second terminal ends. The hinge assembly further includes a housing having a recess for receiving the first terminal end of the torsional spring and the adapter includes a projecting channel for receiving the second terminal end of the torsional spring.

BRIEF DESCRIPTION OF THE DRAWINGS

The above description and other objects, advantages and features of the present invention will be more fully understood and appreciated by reference to the specification and accompanying drawings, wherein:

FIG. 8 is a bottom perspective view thereof;

FIGS. 9(A) and 9(B) are elevational views of a torsion spring of the support system according to the preferred embodiment of the present invention;

DETAILED DESCRIPTION OF THE PREFERRED EMBODIMENTS

Figure 1:
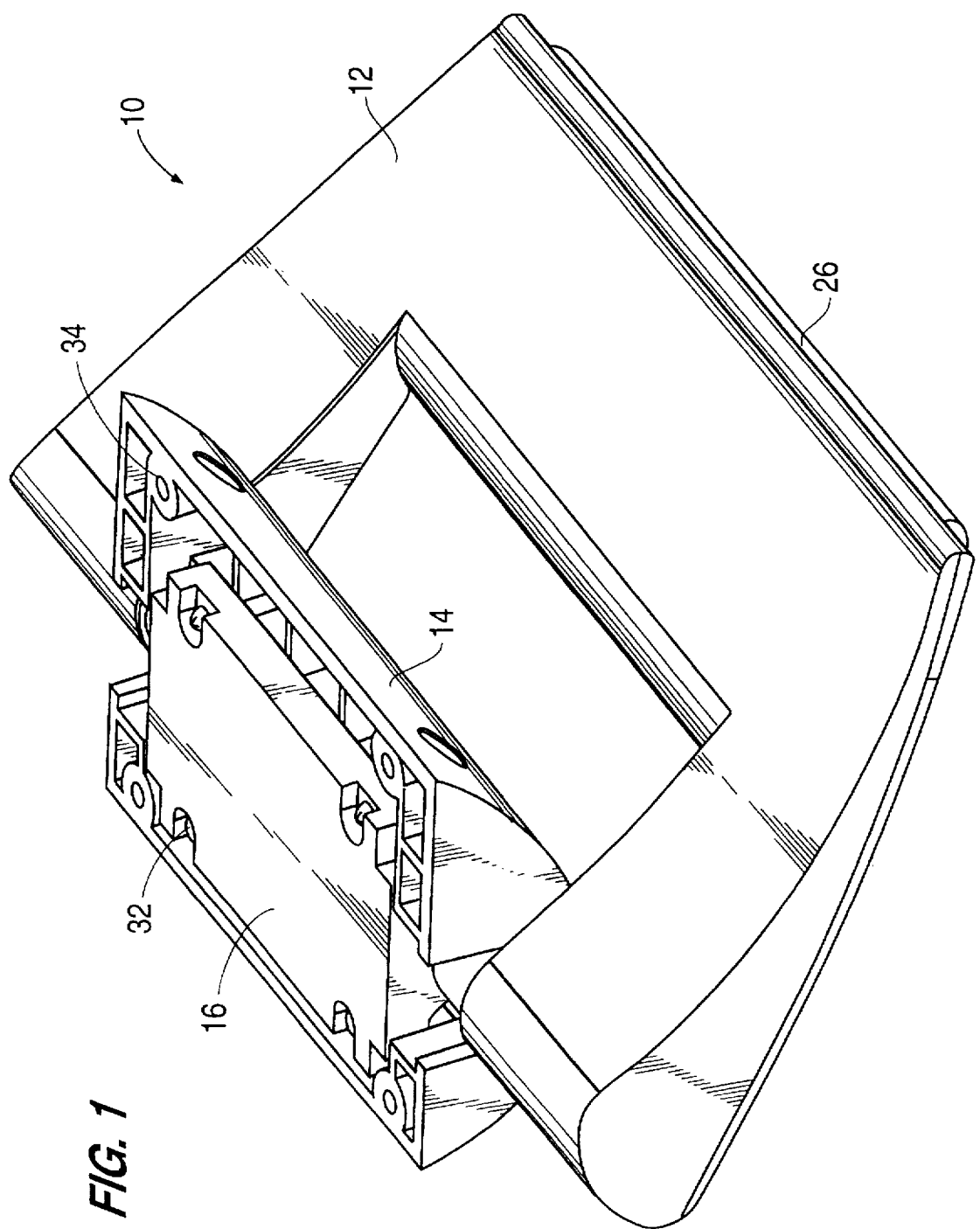
FIG. 1 is a top perspective view of a monitor support system according to a preferred embodiment of the present invention.
Figure 2:
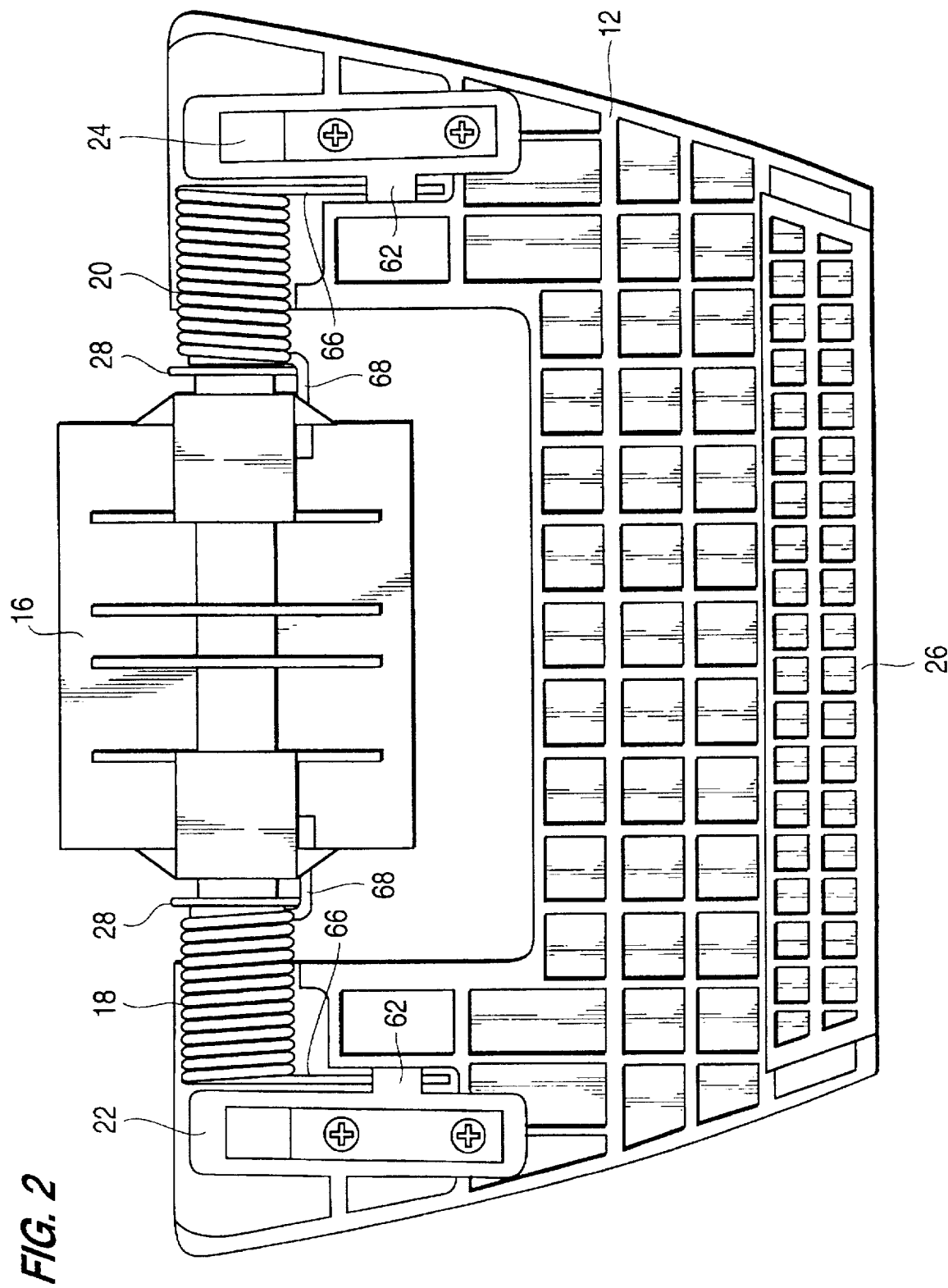
FIG. 2 is a bottom perspective thereof.

A monitor support system in accordance with a preferred embodiment of the present invention is shown generally by reference numeral 10 in FIGS. 1 and 2. Monitor support system 10 includes a foot or base member 12, a housing cover 14 that covers a hinge assembly 16, torsion springs 18, 20 and base adapters 22, 24. Housing cover 14 is preferably attached to hinge assembly 16 by screws 32 and then mounted to the rear underside portion of a monitor 36 by screws inserted through screw holes 34. Although screws are shown and described as the preferred mode of attachment, it should be obvious to one skilled in the art that any type of device for securing components together could also be utilized. As shown in FIG. 12 and discussed in more detail below, hinge assembly 16 and torsion springs 18, 20 allow monitor 36 to be tilted to various display angles as desired by the user, while base member 12 rests on a support surface 30.

Figure 3:
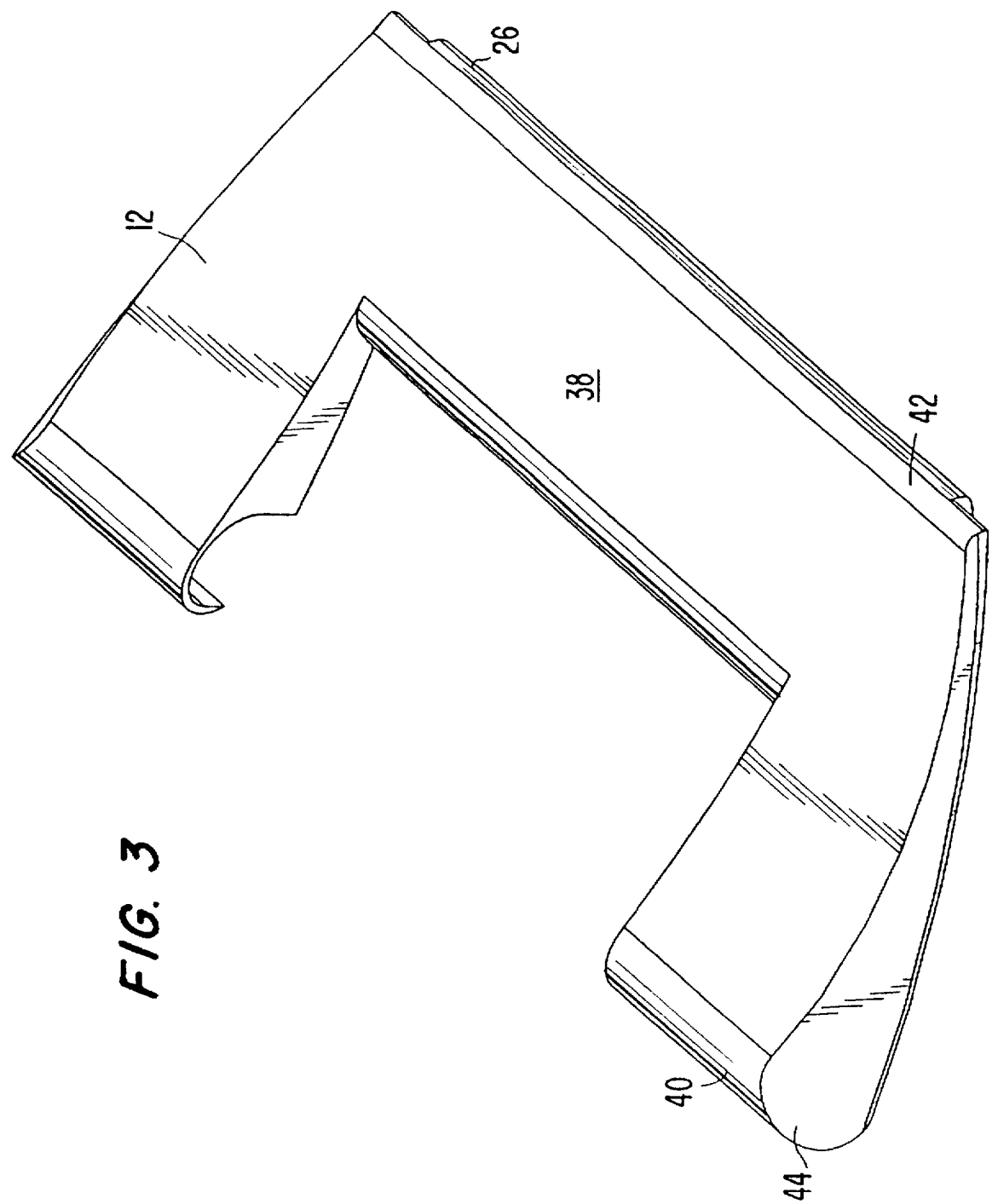
FIG. 3 is top perspective view of a base member of the support system according to the preferred embodiment of the present invention.
Figure 4:
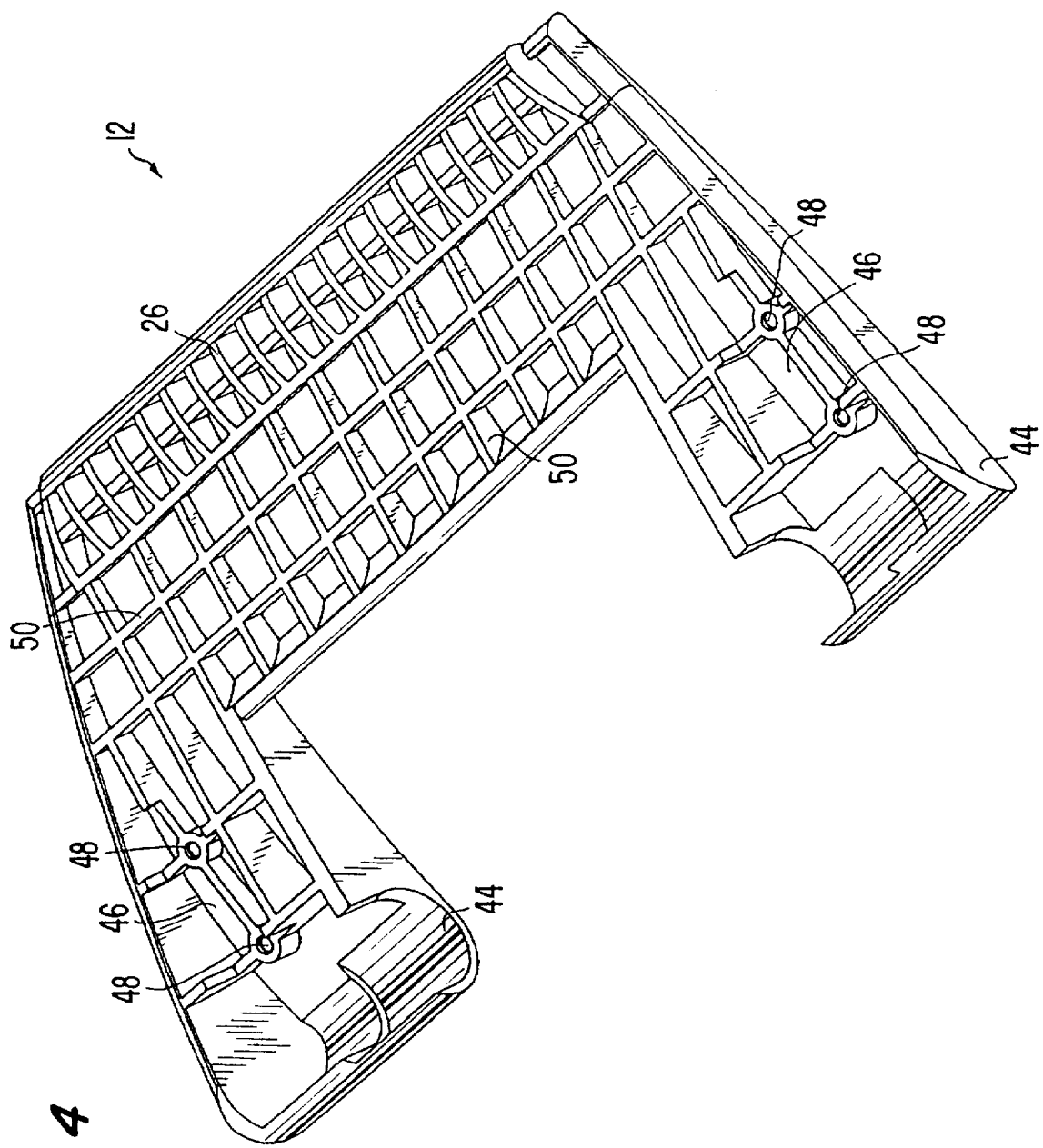
FIG. 4 is a bottom perspective view thereof.

Referring also to FIGS. 3 and 4, foot or base member 12 is shown in greater detail. Base member 12 includes an upper surface 38 having a curved profile that decreases in height between the forward end 40 and the rear end 42, and curves slightly upward at the rear end 42. Forward end 40 of base member 12 includes a bulge 44 sized to receive torsion springs 18, 20. The middle portion of base member 12 includes depressions 46 for receiving base adapters 22, 24 and holes 48 for receiving the screws preferably used in the attachment of the same. The underside of base member 12 includes a plurality of ribs 50 extending longitudinally and transversely thereacross. Ribs 50 are used to provide sufficient strength and rigidity to base member 12 without substantially increasing the amount of material used, the weight of the base member and the cost for producing the same. Although the preferred rib pattern illustrated includes a plurality of quadrilateral elements, it should be obvious to one skilled in the art that various patterns could be used to obtain the same desired result. Base member 12 further includes a base member foot 26 that increases the effective height of the rear end of base 12 and ensures that the rear end 42 of base member 12 remains in contact with support surface 30 during substantially all angles of tilt of the monitor, as discussed below. A pad or other type of rounded bulge could also be added. Alternatively, the curvature of base member 12 could be reduced to form a flatter member such that a foot is not required to obtain the same effect. Base member 12 is preferably manufactured from PCABS using injection molding techniques, although other types of manufacturing techniques and materials could be used, such as acetal, available under the tradename Delrin® or polycarbonate. In a preferred embodiment, base member 12 has a length of approximately 22.5 mm along the rotational axis at the forward end 40 and a length of approximately 16.5 cm along the rear end 42, the sides thereof tapering in a gentle curve therebetween. The width of base member 12 is approximately 12.5 cm.

Figure 5:
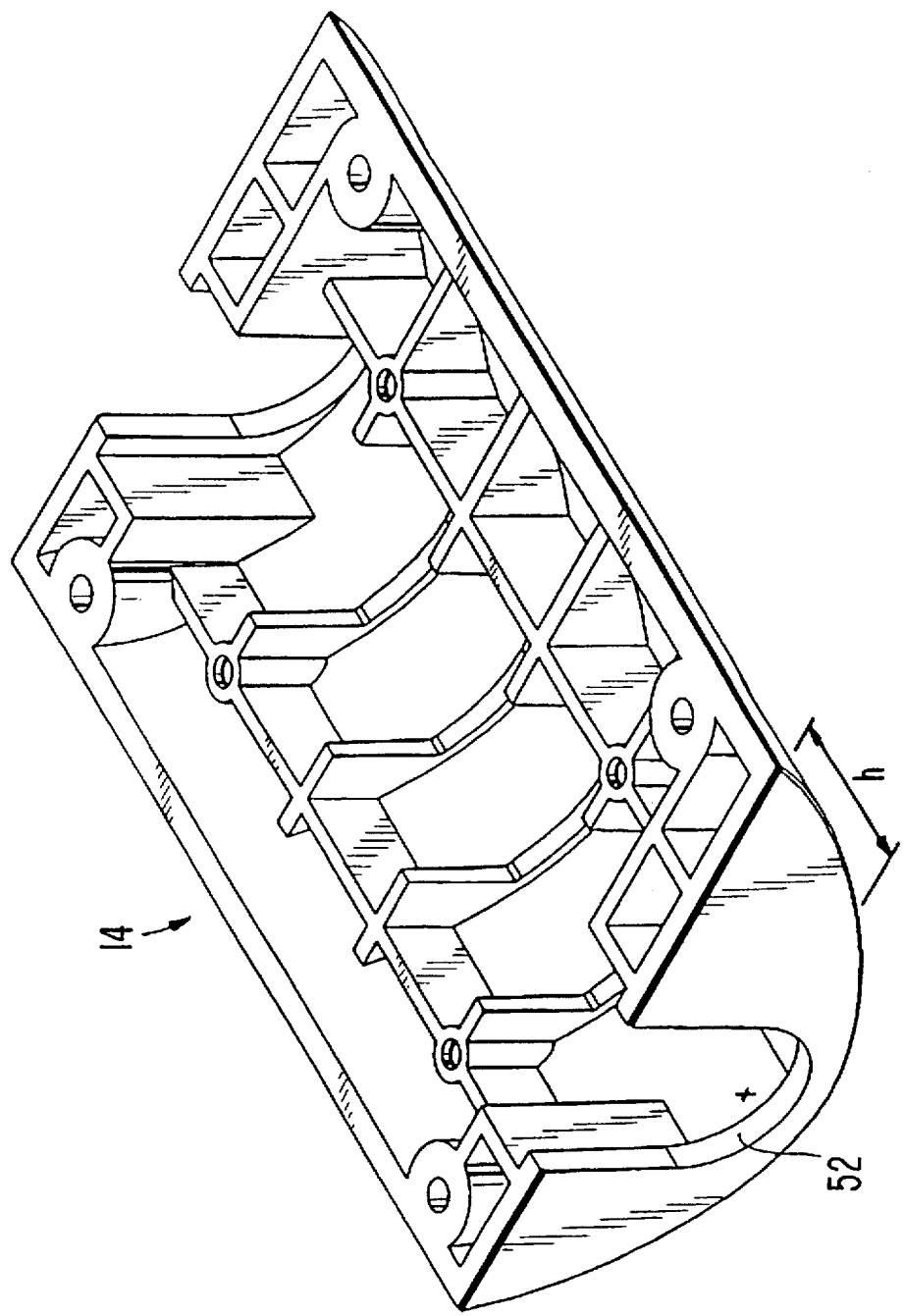
FIG. 5 is a perspective view of a housing cover of the support system according to the preferred embodiment of the present invention.

Referring to FIG. 5, housing cover 14 is shown in greater detail. Housing cover 14 includes on each end a U-shaped recess 52 sized for receiving torsion springs 22, 24. For the preferred embodiment of the present invention, the diameter of U-shaped recess is approximately 20–25 mm, preferably approximately 22 mm. The interior of housing cover 14 is also sized for mounting hinge assembly 16, the vertical height of the housing, illustrated by distance h, being an important design parameter. In a preferred embodiment of the present invention, the vertical height h is approximately 13.8 mm. If depending upon the size of the monitor, as discussed below, a smaller or larger hinge assembly is required to obtain the desired performance, housing cover 14 would also be reduced or enlarged to accommodate the same. The housing cover 14 is securely mounted to the monitor to thereby fasten the support system thereto. The housing cover is preferably attached to both the plastic housing of the monitor as well as to the metal shield, however, the internal ribbing of the housing provides sufficient strength for the housing cover to be secured to only the monitor's plastic housing.

Figure 6:
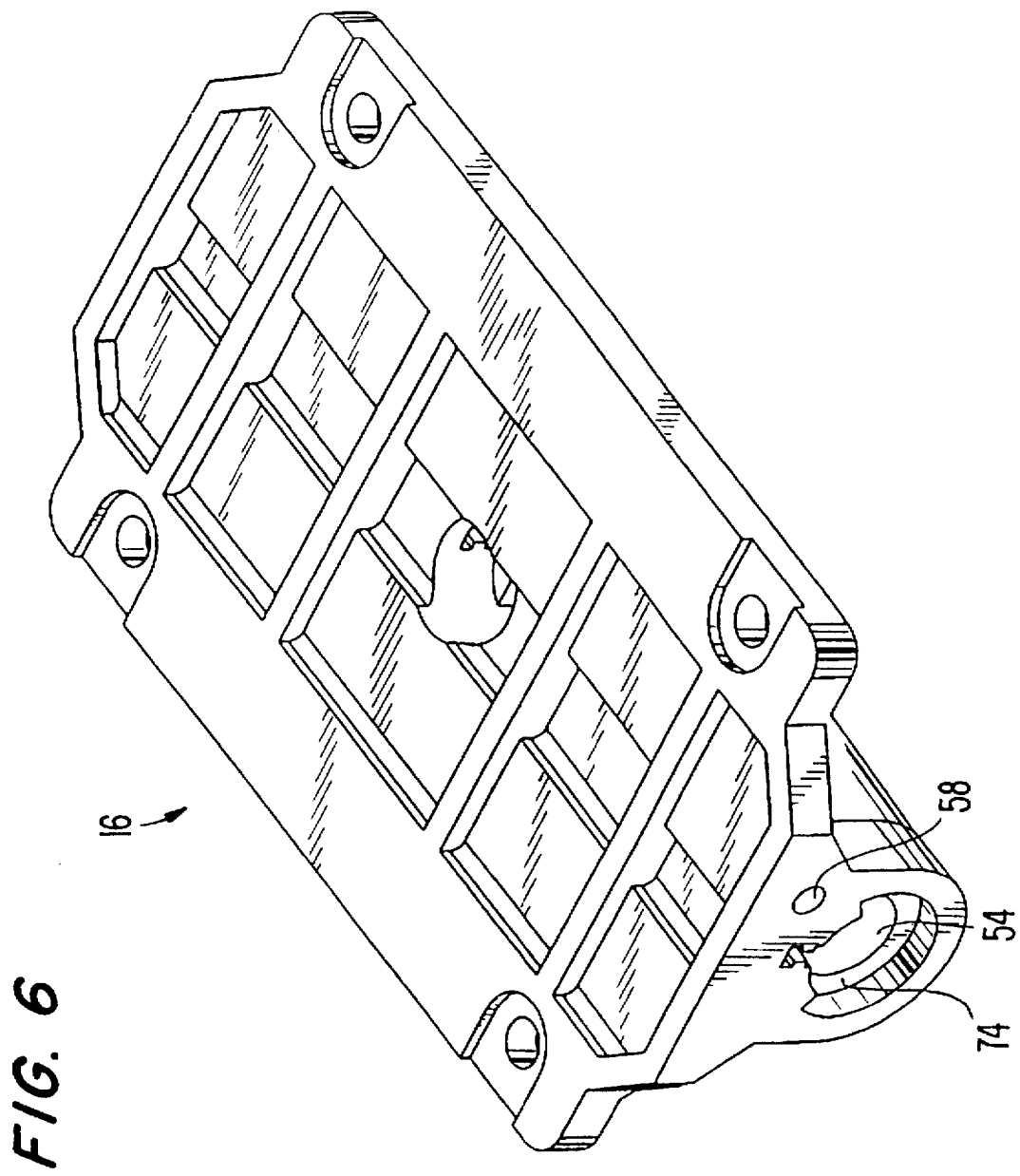
FIG. 6 is a perspective view of a hinge assembly of the support system according to the preferred embodiment of the present invention.

FIG. 6 illustrates hinge assembly 16 that is manufactured in accordance with U.S. Pat. No. 5,491,874, assigned to Cema Technologies, Inc. of Bridgeport, Pa., the entire contents of which are hereby incorporated by reference. Hinge assembly 16 preferably includes an opening 54 on each side thereof for receiving a substantially cylindrical pintle or spindle 56 and a small hole 58 on each side thereof for receiving a terminal end 68 of torsion spring 18, 20, as discussed below. Hinge assembly 16 preferably includes two CEMA Smooth Touch( hinges, although more or less or different hinges may used depending upon the size and weight of the particular monitor and the desired design characteristics.

Figure 7:
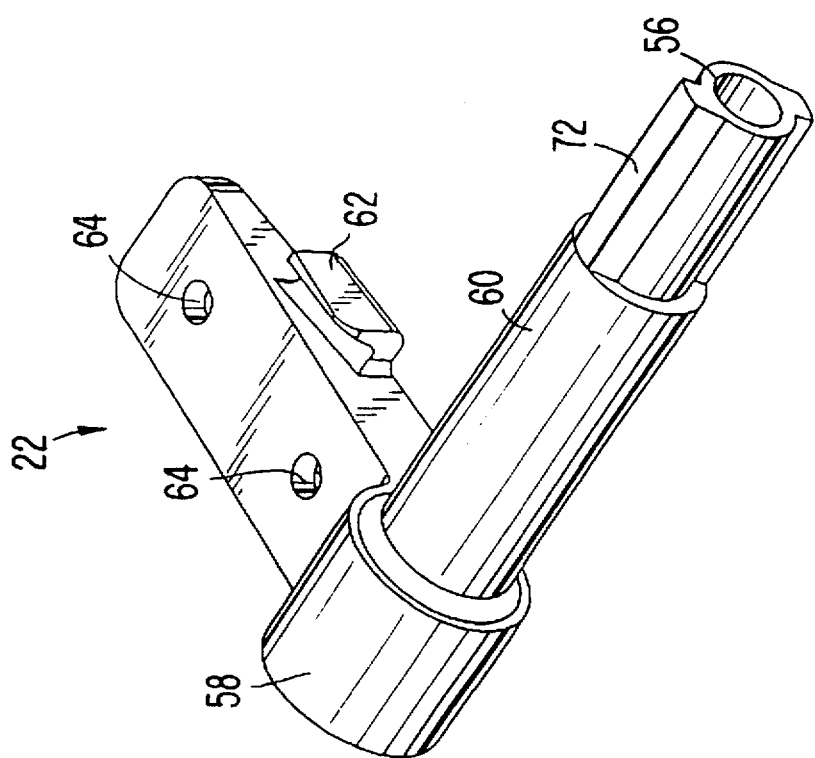
FIG. 7 is a top perspective view of a base adaptor of the support system according to the preferred embodiment of the present invention.

FIGS. 7 and 8 disclose an adapter 22, 24 for use on each side of monitor support system 10. Although only the left side adapter is specifically illustrated, it should be obvious to one skilled in the art that the right side adapter is a mirror image thereof Adapter 22, 24 is preferably manufactured from die cast zinc, although other types of metal such as aluminum or possibly a strong injection molded plastic may also be used. Adapter 22, 24 includes pintle or spindle 56 that is received within opening 54 of hinge assembly 16 and a joining element 58 that includes screw holes 64 in alignment with holes 48 of base member 12 for securing the adapter to the base member with screws. Disposed between spindle 56 and joining element 58 is a middle portion 60 around which torsion spring 18, 20 is wound. As shown most clearly in FIG. 2, a liner 28 preferably made from a nylon or plastic material, may be disposed between spindle 56 and torsion spring 18, 20 in order to avoid the noise caused by contact between the torsion spring and the spindle of the adapter. Adapter 18,20 further includes limit stops 72 projecting from spindle 56. Limit stops 72 contact the interior cowling 74 within opening 54 of hinge assembly 16 and thereby prevent the continued rotation of spindle 56. Preferably, spindle 56 rotates between 49° and 68° depending upon the size and weight of the monitor, although more or less rotation could of course be used if desired. Adapter 18, 20 further includes a hook 62 for receiving a terminal end 66 of torsion spring 18, 20 and holding end 66 in position when adapter 22, 24 is secured against base member 12.

FIGS. 9(A) and 9(B) illustrate in detail torsion spring 18, 20 of the preferred embodiment of the present invention. Torsion springs 18, 20 are preferably formed from music wire. Other materials that could also be used include those commonly used in the formation of torsion springs, such as stainless steel and carbon steel. Although described and illustrated utilizing torsion springs, it is within the scope of the present invention that other types of springs, such as compression springs, flat springs or any type of spring that provides a torque, may also be used if the remaining components are also modified to accommodate the same.

Figure 10:
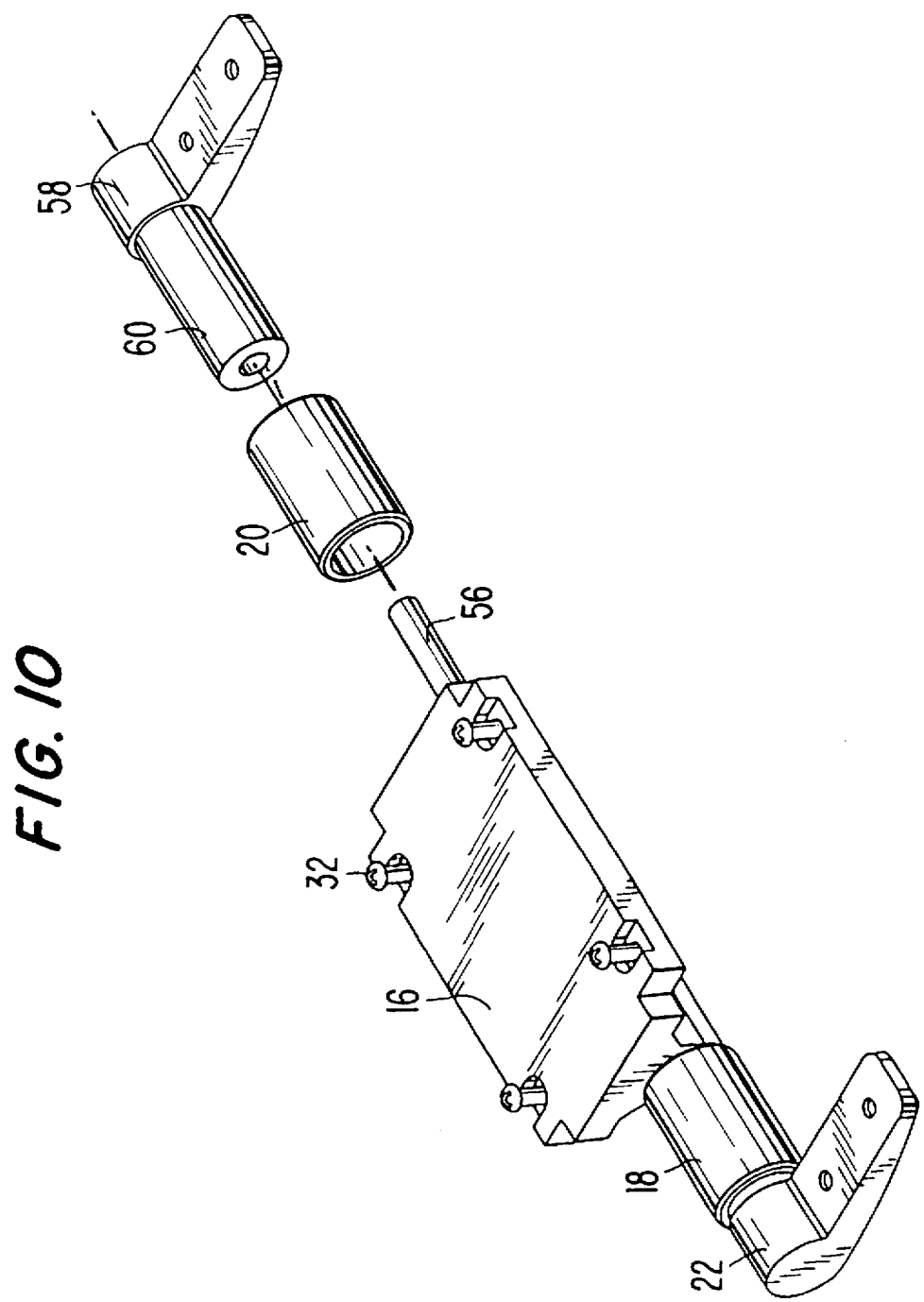
FIG. 10 is an exploded view of the monitor support system of FIG. 1, with the housing cover and base member removed.
Figure 11:
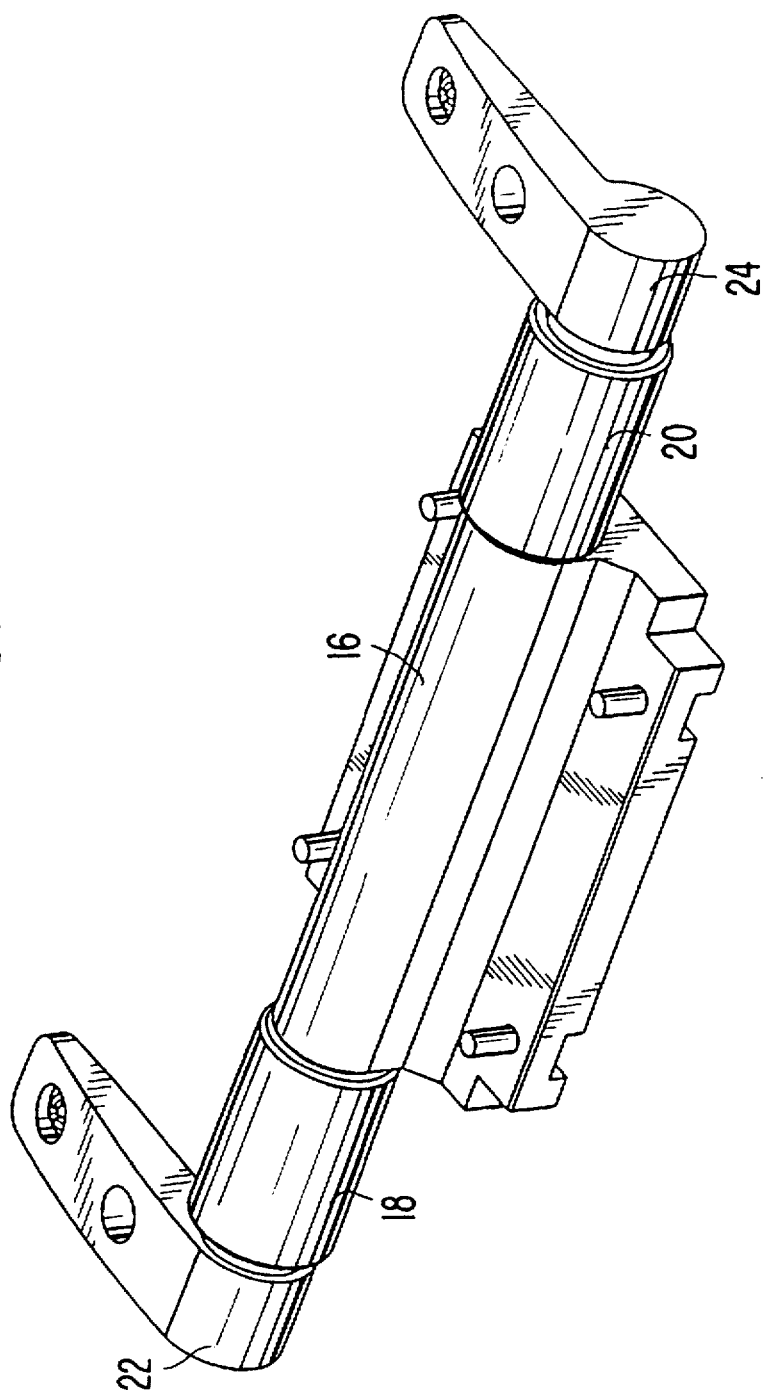
FIG. 11 is an assembled view thereof.

FIGS. 10 and 11 show the exploded and attached components of the monitor support system of the present invention, with the base member and housing cover being removed for clarity and the remaining components being illustrated diagramatically.

The preferred and calculated values for the monitor support system of the present invention were chosen in order to balance a fifteen inch display monitor. The torque values used and the size of components utilized to obtain the required torque must be recalculated if a substantially larger or smaller monitor is desired to be supported. The proper operation of the support system of the present invention depends heavily on the mass and on the center-of-mass of the monitor. By way of example, a 15 inch monitor may typically have a center of gravity where x=110 mm±10 mm and y=210 mm±10 mm and a weight of 14.5 kg.

Figure 12A:
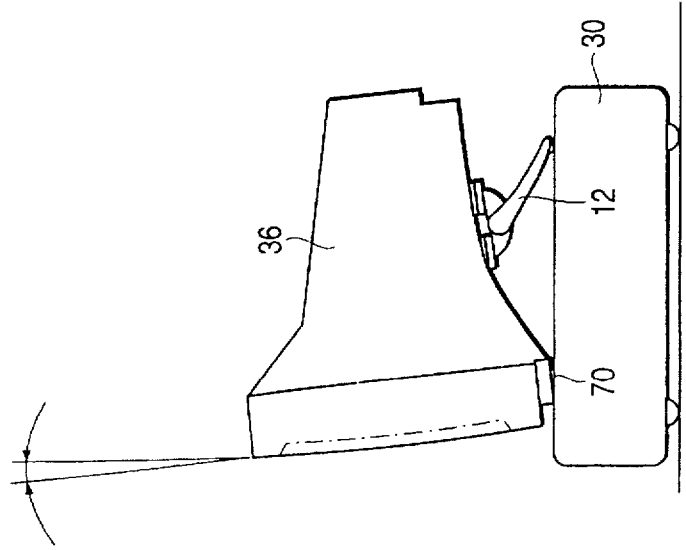
FIGS. 12(A), 12(B), and 12(C) illustrate the monitor support system of the present invention in varying degrees of monitor tilt.
Figure 12B:
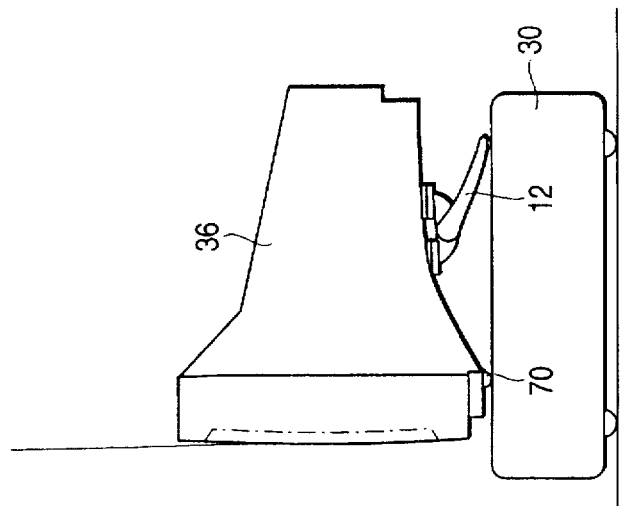
Figure 12C:
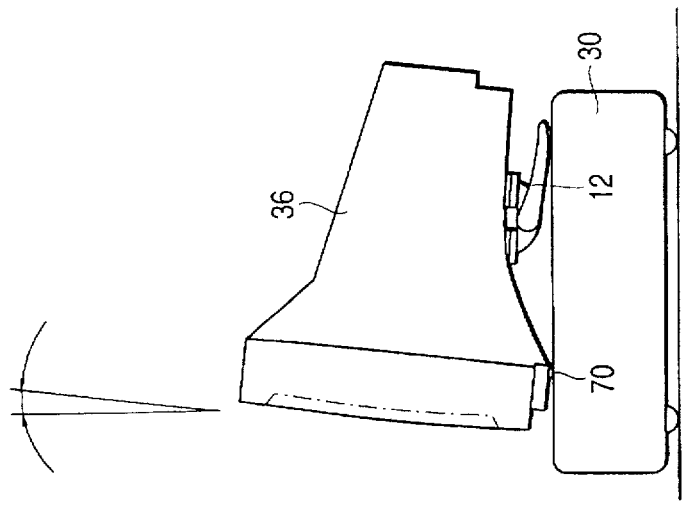

Referring to FIG. 12, the preferred monitor support system 10 allows the monitor to be tilted at least from −5 ° to 10°, the −5 ° corresponding to a 5° tilt forward as shown in FIG. 12(A), 0° corresponding to a vertical position as shown in FIG. 12(B), and the 10° corresponding to a 10° tilt rearward as shown in FIG. 12(C). In the preferred embodiment of invention, the monitor contacts the base member at between an approximately 13° and 14° angle of tilt. The monitor is supported in the front by feet 70, that are rounded elements placed on the forward edge of monitor, and in the rear by the adjustable monitor support system 10 of the present invention. An additional design consideration for the present invention is the changing contact point of feet 70 on the support surface as the monitor is titled from a forward position to a rearward position. That is, when tilted forward, the contact point of feet 70 is generally on the forward portion thereof. As the monitor is tilted rearward, the contact point of feet 70 similarly moves rearwardly along the rounded surface thereof. Further guiding objectives in designing the present invention are that the torque provided by support system 10 be sufficient to support the weight of the monitor at all angles of display and that even when the monitor is tilted to the extreme forward position, thereby reducing the torque in the support system, base member 12 must still remain in contact with the support surface 30.

The hinge assembly for the present invention was chosen because of the smooth, low-profile design and its ability to have differential torque values. That is, differential torque allows a high torque to be oriented in one direction to resist the forces trying to collapse the support system and a low torque to be oriented in the other direction to minimize the torsion spring force necessary to open the support system. These are commonly referred to as asymmetrical hinges. The CEMA hinges used in the present invention have a 2:1 limit on the high torque/low torque ratio. The hinges 16 of the present invention are used in combination with torsion springs 18, 20, and the springs assist in supporting the monitor such that as the spring torque increases, less hinge torque is required to statically balance the monitor. The torque of the torsion springs must always be greater than the low torque of the hinge but not so great that they can lift the monitor from the support surface and thus cause undesirable instability. Thus, the design of the present invention requires a balance between hinge torque and torsion spring torque.

Figure 13:
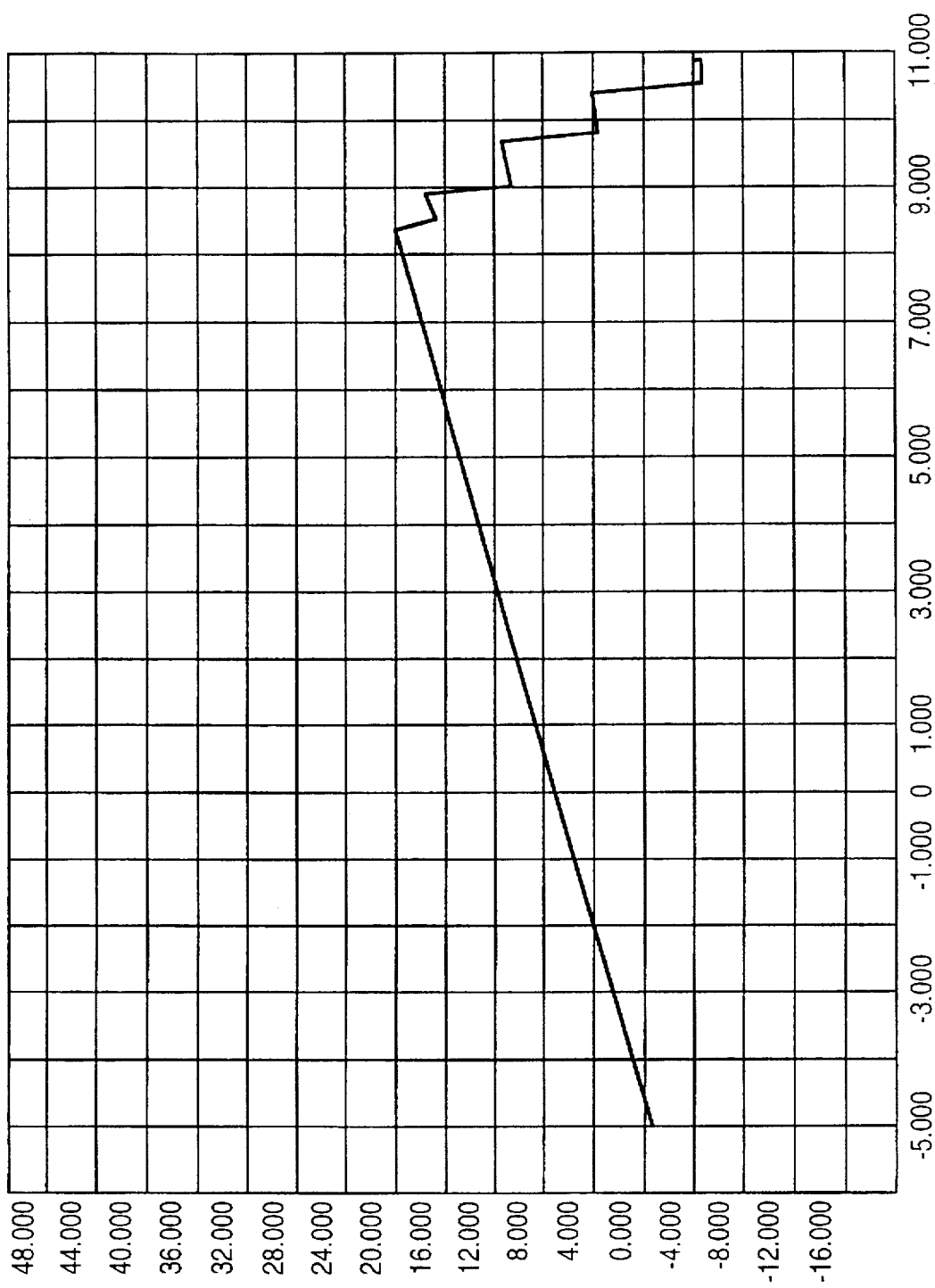
FIG. 13 illustrates the results of a static analysis performed with the monitor support system of the present invention.

A two-dimensional static analysis was performed by computer to balance a fifteen inch computer monitor. The torsion spring constant was varied until the spring torque exceeded the low torque of the hinge by a comfortable margin, but was not permitted to become so large that the torsion spring could actually lift the monitor. A typical result of this type of static analysis is shown in FIG. 13 wherein the minimum required hinge torque to statically balance the monitor is plotted versus the monitor angle. The graph was created using a torque spring constant of 0.145 in-lbs/degree. The peak in the graph at 20 in-lbs indicates that the hinge assembly must provide at least 20 in-lbs of torque in the high torque direction in order to statically balance the monitor if a torsion spring having a torque value of 0.145 in-lbs/degree is used in the present invention.

As a result of further experimentation with this type analysis and following further testing of hinge assemblies, the preferred hinge assembly 16 includes two hinges having a total high torque value of approximately 25–26 in-lbs (12.5–13 in-lbs per hinge). Although CEMA hinges are specified as being used herein, any hinge manufactured having a high torque value of between approximately 40 in-lbs–44 in-lbs after 20,000 cycles (but not exceeding approximately 45 in-lbs–48.4 in-lbs initially) could be used. The torsion springs selected are preferably formed from music wire and have a spring constant between approximately 0.22 and 0.24, although other spring constants may be used depending upon the monitor specifics. The preferred torsion springs are between approximately 170° and 190° at rest and have between approximately 121°–122° preload for an approximately 26.6 in-lb–29.3 in-lb initial torque. This preferred combination of hinges and torsion springs resulted in the most desirable feel and reliable support for the monitor. Other spring loading conditions and materials could of course also be used depending upon the particular design considerations of the monitor and hinge assembly.

The above static analysis also provided further insight to the mechanics of the operation of the support system. Namely, the base member used for the analysis did not include a base member foot 26 and thus was shaped such that as the monitor tilts rearward, the support point (axis of contact) at which the base member contacts the support surface moves forward along the curve of the base member toward the forward end. It is this movement of the support point that causes the above-noted characteristic peak of the torque curve. This peak occurs when the support point begins to move along the curve of the base member. The numerical value of the peak represents the high torque required to balance the particular monitor. A hinge assembly must then be chosen to provide this amount of high torque plus an additional amount that produces a frictional force for monitor adjustment. For instance, the preferred invention requires a 2 kg force to be applied by the user in order to move the monitor for adjustment. This is generally a one-hand adjustment and thus represents a vast improvement of the prior art devices requiring a significant, usually two-hand, force to adjust the monitor angle.

In addition, as the support point between the base member and the support surface moves along the curve of the base member toward the forward end, the lever arm of the torsion force produced by the torsion springs is effectively shortened. As a result, it takes more effort by the user to continue the rearward tilt of the monitor as the support point moves closer to the rotational axis of the base member, i.e., the spindle. As seen in FIGS. 12(A)–12(C), the provision of an arcuate base member foot 26 increases the effective height of the rear end of base 12 and thus serves to confine movement of the support point to a small region adjacent the rear end of the base member throughout substantially the entire range of monitor tilt angles.

It will be obvious to one of ordinary skill in the art that numerous modifications may be made without departing from the true spirit and scope of the present invention, which is to be limited only by the appended claims.

We claim:

1. A support system for varying the rotational angle of a first member relative to a support surface, said support system comprising:

a base member;

a hinge assembly for rotatably coupling the first member to the base member, said base member having a lower surface for contacting said support surface;

a spring assembly coupled to said hinge assembly; and an adapter for connecting said hinge assembly and spring assembly to said base member;

wherein;

said hinge assembly and said spring assembly provide angular positional control of the first member with respect to said base member;

said hinge assembly includes a hinge housing having disposed therein at least one friction element having an internal surface defining a generally cylindrical cavity and at least one general cylindrical pintle having an external surface and first and second portions, said first portion of said pintle being positioned within said cavity such that said external surface of said pintle is in facing frictional engagement with said internal surface of said friction element;

said spring assembly includes at least one torsional spring closely wound about said second portion of said pintle, said at least one torsional spring having first and second terminal ends;

said housing has a recess for receiving said first terminal end of said torsional spring; and said adapter includes a projecting channel for receiving said second terminal end of said torsional spring.

2. The support system of claim 1 wherein said adapter is releasably attached to said base member such that said second terminal end of said torsional spring is retained within said channel.

3. The support system of claim 1 wherein said second portion of said pintle further includes projecting limit stops and wherein said hinge housing includes an internal cowling for contacting said limit stops and thereby limiting the rotation of said pintle.

4. A monitor support system for supporting a monitor having a forward portion and a rear portion, said monitor support system comprising:

a rear foot assembly for adjusting the display angle of a monitor, said rear foot assembly including a hinge assembly, a spring assembly coupled to said hinge assembly, and a base member having a front end adapted for attachment to an underside of said monitor and a rear end for contacting a supporting surface beneath the monitor;

wherein the display angle of the monitor is adjustable from a rearward position such that said rear end of the base member is minimally spaced from the rear portion of the monitor to a forward position such that said rear end of the base member is spaced from the rear portion of the monitor by a maximum distance; and wherein said base member further includes an effective height increasing means for confining movement of a support contact point of the base member with the support surface to a relatively small region adjacent said rear end of the base member, substantially throughout the range of monitor tilt angles.

5. The monitor support system of claim 4 wherein said rear foot assembly further includes a housing cover disposed over said hinge assembly and releasably securable to the monitor.

6. The monitor support system of claim 4 wherein said front end of said base member is sized for receiving said spring assembly and an upper surface of said base member tapers to said rear end having a lesser height than said front end.

7. The monitor support system of claim 4, wherein said effective height increasing means comprises a foot member having a curved undersurface for contacting the support surface at different points there along as the monitor tilt angle is varied.

8. The monitor support system of claim 4, wherein said hinge assembly is a friction hinge assembly.

9. The monitor support system of claim 4, wherein said friction hinge assembly is an asymmetrical friction hinge assembly providing a first hinge torque in a first rotational direction and a second hinge torque greater than said first hinge torque in a second rotational direction.

10. The monitor support system of claim 9, wherein said spring assembly provides a spring torque exceeding said first hinge torque throughout said range of monitor tilt angles.

11. A monitor and support system assembly, comprising:

a monitor; and a rear foot assembly for adjusting the display angle of said monitor, said rear foot assembly including a friction hinge assembly, a spring assembly coupled to said friction hinge assembly, and a base member having a front end attached to an underside of said monitor and a rear end for contacting a supporting surface beneath the monitor;

wherein the display angle of the monitor is adjustable from a rearward position such that said rear end of the base member is minimally spaced from the rear portion of the monitor to a forward position such that said rear end of the base member is spaced from the rear portion of the monitor by a maximum distance; and wherein said friction hinge assembly provides a hinge torque and said spring assembly provides a spring torque, said hinge torque and spring torque being set relative to each other and a weight force of the monitor on said rear foot assembly such that the monitor may be statically balanced in said rearward position, said forward position and positions therebetween.

12. The monitor and support system assembly of claim 11, wherein the hinge assembly provides a hinge torque serving to resist upward movement of the monitor to adjust the display angle toward said forward position, and said spring assembly provides a spring torque greater than said hinge torque but not so great as to cause said upward movement of the monitor.

13. The monitor and support system assembly of claim 11, wherein said hinge assembly is an asymmetrical friction hinge assembly providing a first hinge torque in a first rotational direction and a second hinge torque greater than said low hinge torque in a second rotational direction.

14. The monitor and support system assembly of claim 13, wherein said spring assembly provides a spring torque exceeding said first hinge torque throughout said range of monitor tilt angles.

* * * * *